(12) United States Patent
Debique et al.

(10) Patent No.: US 7,882,510 B2
(45) Date of Patent: Feb. 1, 2011

(54) DEMULTIPLEXER APPLICATION PROGRAMMING INTERFACE

(75) Inventors: Kirt Debique, Seattle, WA (US); Robin C. B. Speed, Hampshire (GB); C. Alan Ludwig, Renton, WA (US); Geoffrey T. Dunbar, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1539 days.

(21) Appl. No.: 10/635,730

(22) Filed: Aug. 6, 2003

(65) Prior Publication Data
US 2005/0030980 A1    Feb. 10, 2005

(51) Int. Cl.
G06F 3/00    (2006.01)
G06F 9/46    (2006.01)
G06F 13/00   (2006.01)

(52) U.S. Cl. ........................................ 719/328; 386/98
(58) Field of Classification Search ................. 719/321, 719/328; 386/98
See application file for complete search history.

(56) References Cited

U.S. PATENT DOCUMENTS

| | | | | |
|---|---|---|---|---|
| 5,065,396 A * | 11/1991 | Castellano et al. | ........... | 370/536 |
| 2,351,002 A | 6/1994 | Burton | | |
| 5,455,910 A * | 10/1995 | Johnson et al. | ............. | 715/251 |
| 5,754,242 A * | 5/1998 | Ohkami | ...................... | 348/441 |
| 5,754,774 A * | 5/1998 | Bittinger et al. | ............. | 709/203 |
| 5,757,416 A * | 5/1998 | Birch et al. | ................ | 725/144 |
| 5,835,591 A | 11/1998 | Cochon et al. | | |
| 6,092,107 A * | 7/2000 | Eleftheriadis et al. | ....... | 709/217 |
| 6,151,441 A | 11/2000 | Kawamura et al. | | |
| 6,172,988 B1 * | 1/2001 | Tiernan et al. | ............. | 370/473 |
| 6,345,147 B1 * | 2/2002 | Mimura et al. | ................ | 386/97 |
| 6,418,271 B1 * | 7/2002 | Cookson et al. | ................ | 386/95 |
| 6,504,994 B2 * | 1/2003 | Kawamura et al. | ............ | 386/95 |
| 6,535,530 B1 * | 3/2003 | Matsui | ....................... | 370/536 |
| 6,611,907 B1 | 8/2003 | Maeda et al. | | |
| 6,631,403 B1 * | 10/2003 | Deutsch et al. | ............. | 709/217 |
| 6,636,222 B1 | 10/2003 | Valmiki et al. | | |
| 6,665,318 B1 * | 12/2003 | Tomokane et al. | .......... | 370/535 |
| 6,891,547 B2 * | 5/2005 | Kang et al. | .................. | 345/555 |
| 6,901,078 B2 * | 5/2005 | Morris | ........................ | 370/466 |

(Continued)

FOREIGN PATENT DOCUMENTS

KR    1020010050513 A    6/2001

(Continued)

OTHER PUBLICATIONS

Sun Microsystems, Inc, "Java Media Framework API Guide", Aug. 2000, Sun Microsystems, JMF 2.0 FCS, pp. section 6, pp. 1-18, and Appendix C.*

(Continued)

*Primary Examiner*—Li B Zhen
*Assistant Examiner*—KimbleAnn Verdi

(57) ABSTRACT

A set of interfaces and data structures (i.e., a demultiplexer API) represents a demultiplexer of multimedia data. The data structure utilizes a number of fields, each containing an element of a command. In one embodiment, at least seven commands are formed for proper operation of the demultiplexer, including Initialize, SetPresentationDescriptor, GetPresentationDescriptor, GetPendingPresentationDescriptor, ProcessInput, ProcessOutput, and Flush commands. The demultiplexer API allows the consumer to use muxed stream data such as DV in a uniform manner to generate elementary stream data such as audio and video (compressed or uncompressed) and allows demultiplexers to be used as an independent component.

20 Claims, 6 Drawing Sheets

U.S. PATENT DOCUMENTS

| | | | |
|---|---|---|---|
| 6,944,186 B2 * | 9/2005 | Zaun et al. | 370/487 |
| 6,975,628 B2 * | 12/2005 | Johnson et al. | 370/389 |
| 7,010,004 B2 * | 3/2006 | Gazit | 370/537 |
| 7,116,712 B2 * | 10/2006 | Vogelaar et al. | 375/240.03 |
| 7,174,560 B1 * | 2/2007 | Crinon | 725/60 |
| 7,603,024 B1 * | 10/2009 | Chun | 386/70 |
| 7,734,864 B2 | 6/2010 | Maeda et al. | |
| 2001/0007568 A1 * | 7/2001 | Morris | 370/473 |
| 2001/0009548 A1 * | 7/2001 | Morris | 370/392 |
| 2001/0031136 A1 * | 10/2001 | Kawamura et al. | 386/98 |
| 2002/0107979 A1 | 8/2002 | Sarnikowski et al. | |
| 2003/0026276 A1 * | 2/2003 | Gazit | 370/412 |
| 2003/0085902 A1 * | 5/2003 | Vogelaar et al. | 345/505 |
| 2003/0182627 A1 * | 9/2003 | Chung et al. | 715/513 |
| 2004/0004631 A1 | 1/2004 | Debique et al. | |
| 2004/0190515 A1 * | 9/2004 | Nogima et al. | 370/392 |
| 2008/0209115 A1 | 8/2008 | Maeda et al. | |

FOREIGN PATENT DOCUMENTS

| | | |
|---|---|---|
| RU | 2142167 C1 | 11/1999 |
| RU | 2 143 726 C1 | 12/1999 |
| WO | 9418776 | 8/1994 |
| WO | WO 9846006 A2 * | 10/1998 |
| WO | WO 01/61488 A2 | 8/2001 |

OTHER PUBLICATIONS

J.M. Kappes and S.I. Sayegh, Programmable Demultiplexer/Demodulator Processor, 5 pages, COMSAT Laboratories, Clarksburg, Maryland.

Marco RE et al., Efficient Implementation of a Filter Bank Architecture for Demultiplexing in Satellites Applications, 5 pages, Univ. of Rome "Tor Vergata", Dept. of Electronic Eng., Rome, Italy.

U.S. Appl. No. 09/629,234, filed Jul. 31, 2000, Speed et al.

U.S. Appl. No. 09/629,289, filed Jul. 31, 2000, Crites et al.

Office Action cited in related European Application No.: 03019007.8-1244 dated Jul. 29, 2009.

European Search Report, Application No. EP 03 01 9007, dated Feb. 13, 2004, 3 pgs.

Office Action cited in related European Application No.: 03019007.8-1244 dated Jun. 2, 2007, 7 pgs.

Office Action cited in related Russian Application No. 2003125827, dated Oct. 8, 2007, 8 pgs.

Office Action cited in related Shanghai Application No. 03158834.4, dated Sep. 3, 2007, 9 pgs.

Office Action cited in related Shanghai Application No. 03158834.4, dated May 6, 2009, 3 pgs.

Notice of Rejection in related Japanese Application No. 2003-299342, dated May 9, 2008.

"MPEG and Multimedia Communications", Leonardo Chiarliglione, IEEE Transactions on Circuits and Systems for Video Technology, vol. 7, No. 1, Feb. 1997, 14 pgs.

"Extending JMF", 1999, 24 pgs., Reprinted from the Internet at: http://members.jcom.home.ne.jp/311721660/jmf2guide. JMFExtending.html.

Decision to Grant cited in related Japanese Application No. 2003-299342 dated Dec. 16, 2008, 3 pgs.

Notice on Grant cited in related Chinese Application No. 03158834.4 dated Dec. 4, 2009, 1 pg.

Decision on Grant cited in related Russian Application No. 2003125827/09(027567), dated Aug. 21, 2003, 5 pgs.

* cited by examiner

DEMULTIPLEXER APPLICATION PROGRAMMING INTERFACE

FIELD OF THE INVENTION

This invention relates generally to electronic data processing and, more particularly, relates to handling multimedia data in a computing environment.

BACKGROUND OF THE INVENTION

Digitally based multimedia, the combination of video and audio in a digital format for viewing on a digital device is rapidly increasing in capacity and proliferation. Nearly every new personal computer manufactured today includes some form of multimedia. Sales of digital products such as cameras, video recorders, phones and televisions are steadily increasing. Multimedia is also becoming increasingly prevalent in the Internet realm as the growth of the Internet steadily and rapidly continues. Along with this growth have come increased performance expectations by the users of such computer equipment. These increased user expectations extend not only to hardware capability, but also to the processing capability of the data itself.

A technique known as streaming has been developed for multimedia applications to satisfy these increasing expectations. Streaming allows data to be transferred so that it can be processed as a steady and continuous stream. This has the benefit that data can be displayed or listened to before the entire file has been transmitted, a must for large multimedia files.

Initially, the streaming framework consisted of a chain of data processing modules (e.g., capturing filters, transformation filters, and rendering filters) with very little intelligence from the chain manager. The data processing modules, also called filters, make the decisions on how to get connected, what data formats to use, and how to control each other. During connection of filters in a chain, protocols define a predefined fixed sequence of data flow and control connection negotiations. A typical negotiation sequence is to negotiate the following in order: the interface, the medium, the data format, the allocators, and the master clock. The data processing chain provides an end-to-end solution within a computer system.

As the complexity of streaming increased, the industry recognized that it became necessary to optimize the processing chains that were processing data with real-time constraints such as video and audio processing chains. One solution is DirectShow® by Microsoft® Corporation, which provides playback of multimedia streams from local files or Internet servers, capture of multimedia streams from devices, and format conversion of multimedia streams. DirectShow® enables playback of video and audio content of file types such as Windows Media Audio, Windows Media Video, MPEG, Apple® QuickTime®, Audio-Video Interleaved (AVI), and WAV (Windows Wave). DirectShow® includes a system of pluggable filter components. Filters are objects that support DirectShow® interfaces and that are capable of operating on streams of data by reading, copying, modifying and writing data to a file. The basic types of filters include a source filter, which takes the data from some source, such as a file on disk, a satellite feed, an Internet server, or a VCR, and introduces it into the filter graph, which is a connection of filters. The filters in a filter graph include a transform filter, which converts the format of the data, a sync and source filter that receives data and transmits the data; and a rendering filter, which renders the data, such as rendering the data to a display device. The data can also be rendered to any location that accepts media. Other types of filters included in DirectShow® include effect filters, which add effects without changing the data type, and parser filters, which understand the format of the source data and know how to read the correct bytes, create times stamps, and perform seeks.

During operation, all data passes from filter to filter along with a great amount of control information. Each filter contains objects called "pins" that are used to connect to other filters. When filters are connected using the pins, a filter graph is created. Note there is a distinction between a "filter graph" which is the concept of a group of connected filters, and a "Filter Graph" which is the object you create in DirectShow® that controls the group of connected filters, the "filter graph". The "Filter Graph" is more correctly called a filter graph manager. To control the data flow and connections in a filter graph, DirectShow® includes a filter graph manager. The filter graph manager assists in assuring that filters are connected in the proper order. However, the data and much of the control do not pass through the filter graph manager. Filters must be linked appropriately. For example, the filter graph manager must search for a rendering configuration, determine the types of filters available, link the filters in the appropriate order for a given data type and provide an appropriate rendering filter.

While filters allowed a great deal of reuse of programs, the use of these filters also created some unanticipated problems. One of the problems created by the filters is the large number of API's for the filters that came into being. Each filter essentially has a separate API. As a result, a given filter must be capable of interfacing to the API for every filter to which it might attach. Also, the use of filters creates the problem of shutting down a given filter problematic. When a given filter in a graph is shut down, any filter that interfaces with the shut down filter requires a different associated interface. In general, programming a filter to gracefully handle the loss of an interface is difficult, as the state of the filter can be unknown when the interface is lost. The loss of interfaces, therefore, tends to lead to unpredicted behavior in the filters and ultimately to ill behaved programs. Further, the overall control in DirectShow® is distributed between two blocks. The interface between the filters controls the data flow while the filter manager controls the instantiation and removal of filters. Distributing the control in this manner makes software design cumbersome, as there are inevitably some control functions that cross the boundary between the blocks. Another problem with DirectShow is that the filters shoulder the responsibility of media format negotiation and buffer management functionality. Filters communicate with other filters to accomplish this task. The dependency on filters causes applications building on DirectShow to be susceptible to bugs and inefficiencies that could be programmed into a filter. Thus, a badly written filter could easily bring down the filter graph and an application associated with the filter graph.

There is a need to improve the DirectShow® architecture. More particularly, there is a need to improve control of processing of multimedia data.

BRIEF SUMMARY OF THE INVENTION

The invention includes a set of interfaces, data structures and events for representing a demultiplexer of multimedia data. The data structure utilizes a number of fields, each containing an element of a command. In one embodiment, at least seven commands are formed for proper operation of the demultipexer, including Initialize, SetPresentationDescriptor, GetPresentationDescriptor, GetPendingPresentationDescriptor, ProcessInput, ProcessOutput, and Flush commands. The interfaces are collectively known as the Demultiplexer Application Programming Interface (Demux API). The Demux API allows the consumer to use muxed stream data such as DV in a uniform manner to generate elementary stream data such as audio and video (compressed or uncompressed).

The Initialize method is used to initialize and configure the demultiplexer object and has parameters that are used to configure the demultiplexer. The parameters include a muxed stream descriptor object that describes the muxed stream, a selected media type for the muxed stream descriptor, an array of major types of elementary streams that the user is interested in retrieving as output from the demultiplexer, and a count of the major types in the array of major types.

The SetPresentationDescriptor method is used to dynamically set the active presentation descriptor on the demultiplexer object. The SetPresentationDescriptor method includes a pointer to a presentation descriptor object. The ProcessInput method is used to provide a new input muxed stream to the demultiplexer object and includes a pointer to a sample object. The ProcessInput method has a return value that has a new presentation flag. If the new presentation flag has a TRUE value, the presentation has changed based on the presentation descriptor in the muxed sample. The user must call GetPendingPresentationDescriptor method to retrieve the next pending presentation, select desired streams, and call the SetPresentationDescriptor method to enable processing of samples from the demultiplexer's input queue.

The ProcessOutput method is used to retrieve at least one elementary stream from an active presentation. The ProcessOutput method includes a stream identifier and a pointer to a pointer to a sample object. The ProcessOutput method further includes an output return value. The output return value includes an end of stream error code and a no more data error code.

The Flush method is used to flush currently queued input and output samples. No parameters are needed for the Flush method.

The GetPresentationDescriptor method is used to retrieve a clone of the currently active presentation descriptor on the demultiplexer object. The GetPresentationDescriptor method includes a presentation descriptor.

The GetPendingPresentationDescriptor method is used to retrieve the next pending presentation. The GetPendingPresentationDescriptor method includes a pending presentation descriptor.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
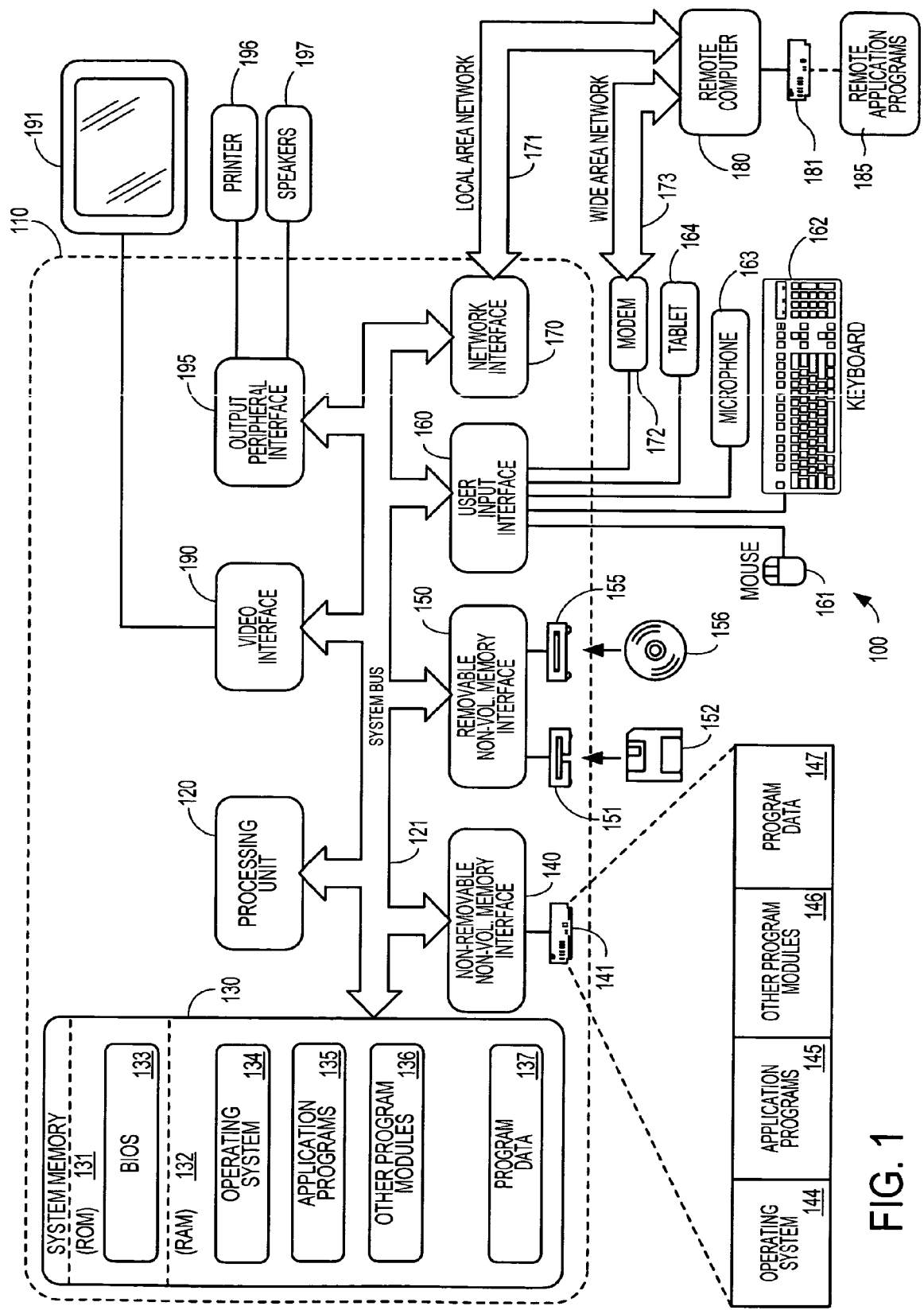
FIG. 1 is a block diagram generally illustrating an exemplary computer system on which the present invention resides.

The invention provides a set of interfaces, data structures and events for representing a demultiplexer of multimedia data that are collectively called a demultiplexer API. The API allows the consumer to use muxed stream data such as DV, MPEG2, ASF, etc. in a uniform manner to generate elementary stream data such as audio and video (compressed or uncompressed). The demultiplexer API supports dynamic generation of new stream descriptors based on the muxed stream initialization data and supports dynamic generation of new stream descriptors based on the muxed stream samples. Additionally, the demultiplexer API supports either out of band initialization via metadata about the muxed stream or in band initialization via muxed stream samples and supports generation of demultiplexed samples which can span multiple buffers. In the context of the Media Foundation architecture by Microsoft® Corporation, the demultiplexer API is primarily controlled by, and output delivered to, a media processor as described herein below. The demultiplexer API is designed such that any multimedia architecture should be able to use a demultiplexer in a well-defined manner.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162, a pointing device 161, commonly referred to as a mouse, trackball or touch pad, a microphone 163, and a tablet or electronic digitizer 164. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, the computer system 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 10 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 10, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
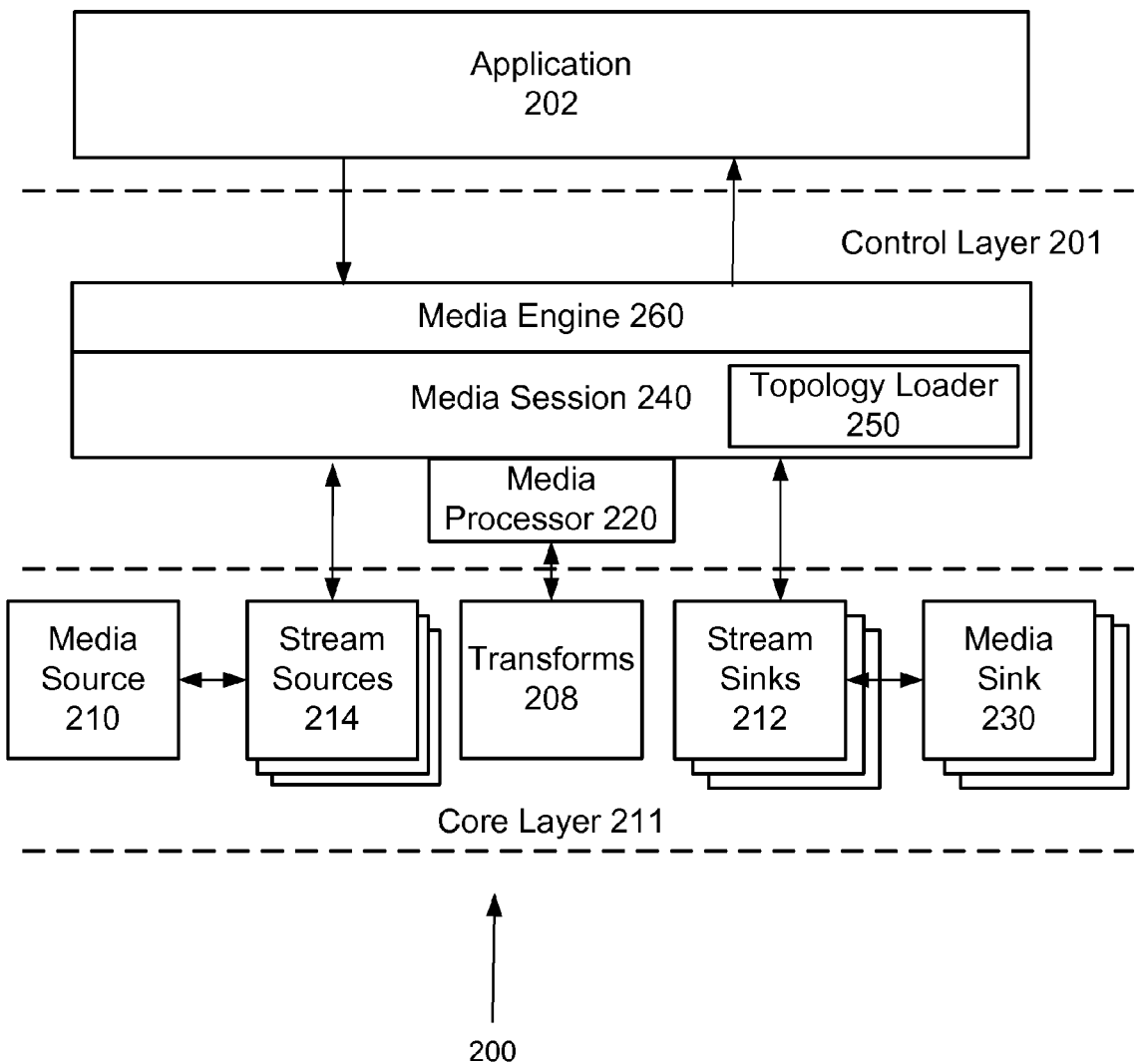
FIG. 2 is a block diagram generally illustrating an exemplary computer environment in which the present invention operates.

Turning now to FIG. 2, the demultiplexer of the present invention may operate in the Media Foundation architecture, which is an implementation of one of Microsoft's multimedia architectures. While FIG. 2 shows the demultiplexer in the Media Foundation architecture, it is recognized that the demultiplexer API of the invention is usable in other multimedia architectures. Prior to describing the demultiplexer, the Media Foundation shall be described. Media Foundation is a componentized architecture. As shown, Media Foundation includes core layer 211 components that are responsible for some basic unit of functionality in Media Foundation, and Control layer 201 components, responsible for performing more general tasks using the underlying Core component.

Core layer 211 components include media sources 210 and stream sources 214, which provide multimedia data through a generic, well-defined interface. The media sources 210 describe the presentation, including streams to be accessed. There are many implementations of media sources, for providing multimedia data from different multimedia file types or devices. Core layer 211 further includes transforms shown in block 208, which perform some sort of transformation operation on multimedia data through a generic, well-defined interface. Transform examples are codecs, video resizers, audio resamplers, statistical processors, color resamplers, and others. The demultiplexer of the present invention, which takes interleaved multimedia data as an input, and separates the data into individually useful media streams of multimedia data is a transform in the architecture of FIG. 2. Block 208 further includes multiplexers, which take individual media streams and combine them into interleaved multimedia data. Multiplexers share a common, well-defined interface, and there are many implementations for multiplexing into different types of multimedia data. Core layer 211 further includes stream sinks 212 and media sinks 230. Media Sinks 230 accept multimedia data as input through a generic, well-defined interface. There are many implementations of media sinks for performing different functions with multimedia data. For instance, writing the multimedia data to a given file type, or displaying the multimedia data on a monitor using a video card.

Control layer 201 components use the core layer 211 components to perform higher-level tasks in a simpler way. Typically a control layer component will use many different core layer components for a given task. For instance, playing back a multimedia file will involve a media source to read the file from disk and parse the data, one or more transforms to decompress the compressed multimedia data, and one or more media sinks to display the multimedia data. Control layer 201 includes media engine 260, which interacts with application 202 to receive and send media streams, media session 240, media processor 220 and topology loader 250, shown within media session 240. Topology loader 250 is a control layer component responsible for describing the data flow between the core layer components. A control layer components can be configured to avoid access to the more primitive core-level components used by the control layer. Data flows through system beginning with a media source 210 flowing through the media session 240 to media processor 220 and an output at media sink 230. Media processor 220 runs a pipeline of media sources and other components in the topology. Media session 240 guides when events in a topology occur, and the topology loader 250 ensures that events prescribed in a topology occur. The media session 240 also configures the media processor 220 and consumes the samples returned by the media processor 220. It does this in the context of the media engine 260 and sends the samples from the media processor 220 to the media sinks it has negotiated with the caller of the media engine 260 (e.g., application 202). The Components in a topology include media source 210 components and media sink 230 components as well as other nodes. The media foundation system 200 provides interfaces and a layout for connecting streaming media objects. The system allows a user to specify connections between generic or specified sources, transforms, and sink objects via a symbolic abstraction using a topology concept.

Figure 3:
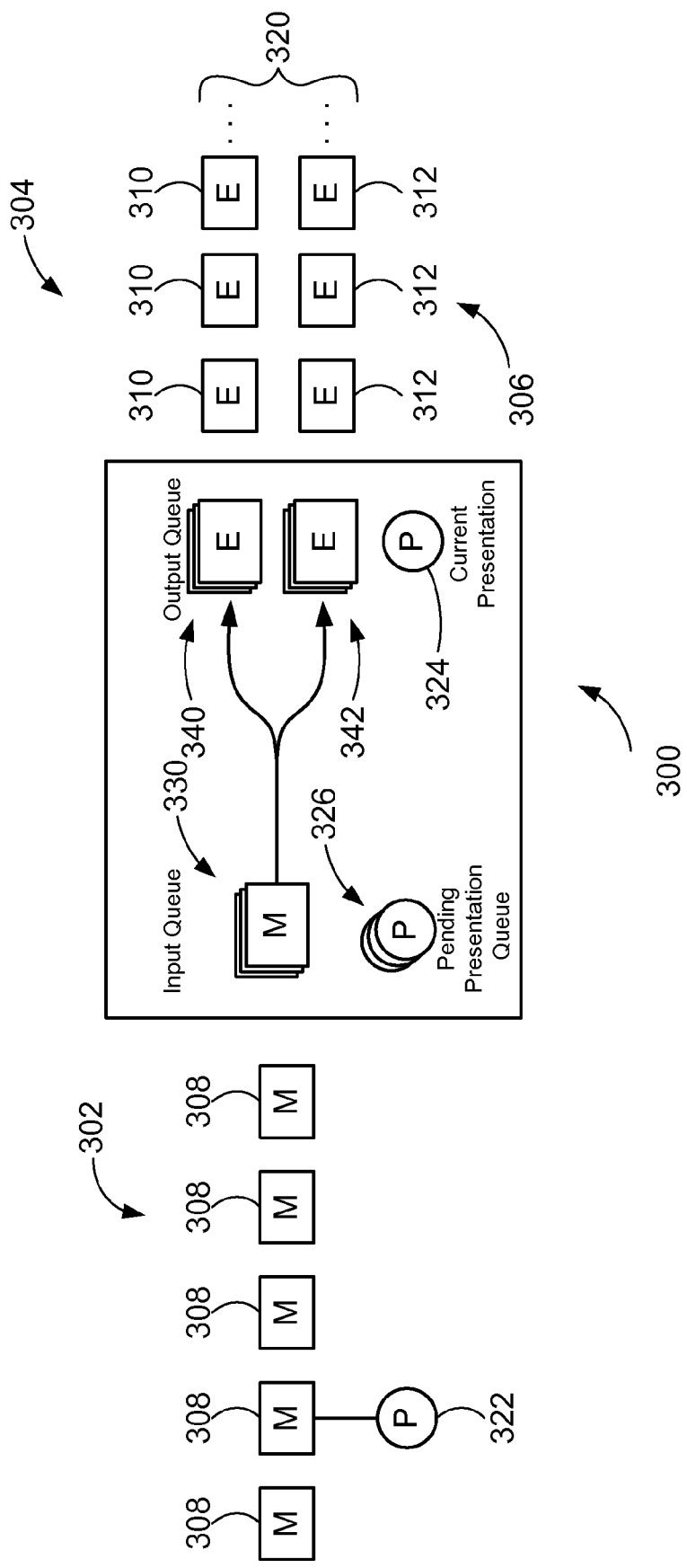
FIG. 3 is a block diagram illustrating a demultiplexer in accordance with the teachings of the present invention.

Turning now to FIG. 3, an overview of the demultiplexer 300 shall now be described. In the description that follows, commands will be referenced in the description. These commands are described herein below. The demultiplexer API separates the format of the data from the source of the data. The demultiplexer API takes multiplexed data as an in-memory buffer of data, and performs the demultiplex operation. This has the desired effect that many different sources of data can use the same implementation of the demultiplexer to perform this operation. For example, DV data can come directly from a DV camera, but can also be stored as a file on a hard drive. In this case, there are two pieces of code for generating the multiplexed DV data (e.g., one that talks to the camera, another that talks to the file system), but the same demultiplexer implementation can be used. The demultiplexer 300 supports the IMFDemultiplexer interface and is responsible for splitting a muxed stream into its elementary stream parts. The demultiplexer 300 operates in a synchronous fashion (similar to a DMO), and can handle dynamic changes in the available elementary streams caused by changes in the muxed stream. It accepts and generates samples which are expressed via the IMFSample interface, and accommodates generating samples which span multiple buffers.

A muxed stream 302 is a single stream that contains more than one elementary stream. An elementary stream 304, 306 is a stream of like elements (e.g., audio, video, etc.). There isn't necessarily any kind of one-to-one correspondence between muxed samples 308 and elementary samples 310, 312. For example, there may or may not be a complete elementary sample for every elementary stream in every muxed sample. Additionally, there is no particular requirement that the elementary samples be in the correct order in the muxed stream either. The elementary samples coming out of the stream may not share the same timestamps. One elementary stream may be at an offset from the other. Some muxed streams can contain only a single set of elementary streams for the duration of the stream. Some muxed streams may have different sets of elementary streams at different times.

Each set of coordinated elementary streams is called a presentation 320. Each set has a corresponding presentation descriptor 322. This presentation descriptor 322 has two main purposes. First, it describes the media types of each elementary stream. Second, it provides a mechanism to select which of the available streams are to be extracted by the demultiplexer 300. The Current Presentation 324 always describes the selected streams and data-types of the current output streams.

Before a sample can be processed by the demultiplexer 300, a splitting algorithm used to transform multiplexed samples to elementary samples needs to know what streams are to be extracted. This information is contained in the presentation descriptor 322. Before the streams are selected, the presentation descriptor is "pending". Once the streams are selected the presentation descriptor is "active". To make a presentation active, it is retrieved from the pending presentation queue 326 by calling GetPendingPresentationDescriptor. The appropriate streams are selected and then the caller invokes the SetPresentationDescriptor method. At this point (if certain conditions are met), the presentation becomes the active presentation 324 and is removed from the pending presentation queue 326. A pending presentation can only become active if all output from the previous active presentation has been serviced.

The demultiplexer 300 contains at least two sets of queues. The queues are input queues 330 and output queues 340, 342. When ProcessInput( ) is called on the demultiplexer 300, the input may be immediately processed or put in the input queue 330. Once the data is processed, it is put into an output queue 340, 342. The data types and streams available in the output queues always correspond to the current active presentation 324.

Figure 4:
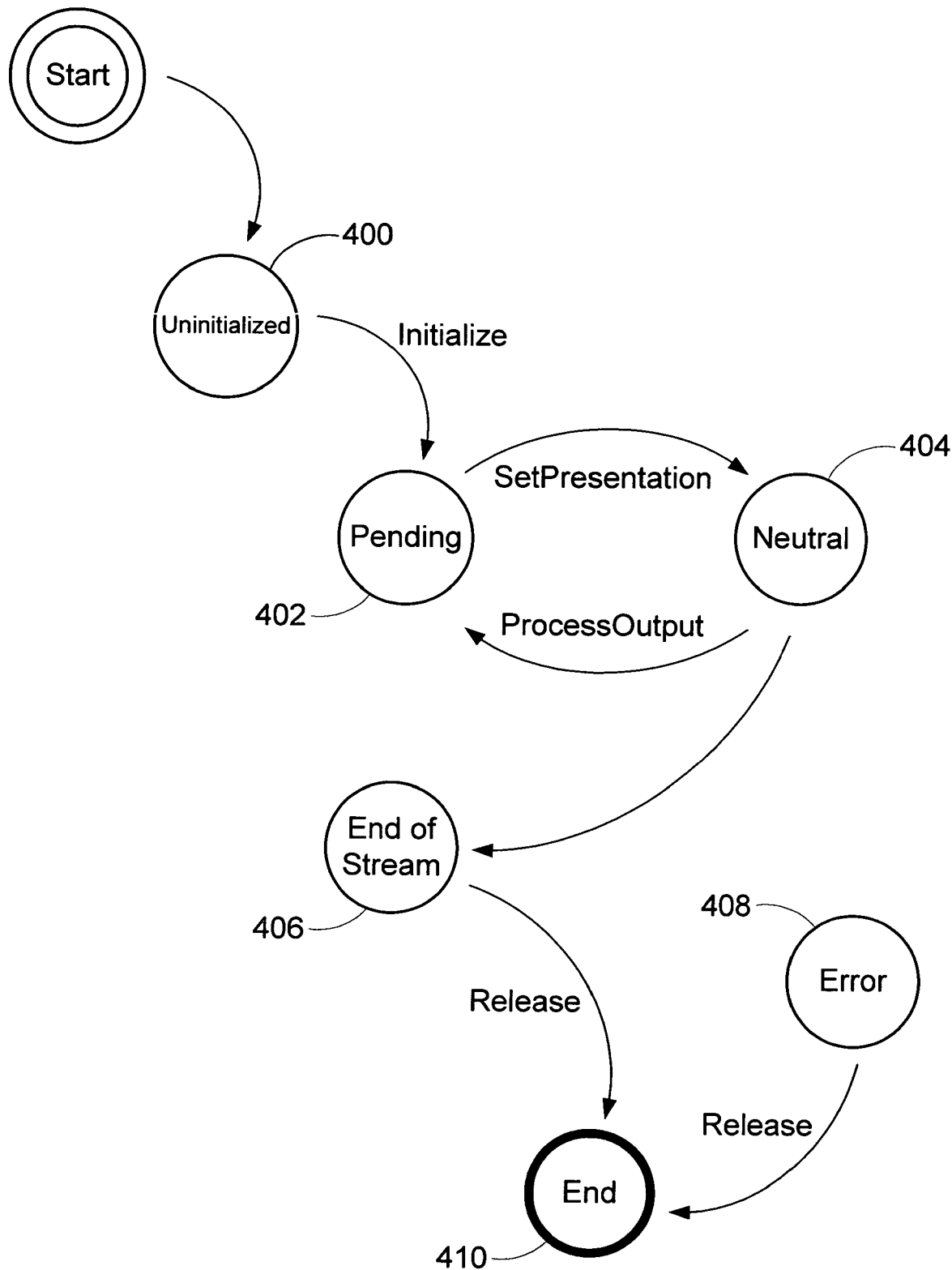
FIG. 4 is a state transition diagram of the demultiplexer of the present invention.

Now that the overall description of the demultiplexer 300 has been described, the states and transitions of the demultiplexer 300 shall be described. In the description that follows, commands will be referenced in the description. These commands are described herein below. Turning now to FIG. 4, the demultiplexer 300 is in the uninitialized state 400 when the demultiplexer 300 has been created but Initialize has not yet been called. Initialize is the only valid operation on the demultiplexer object 300 in this state. Calling Initialize( ) will transition the demultiplexer 300 to the pending state 402.

The pending state 402 indicates that there is no valid active presentation. Calls to ProcessOutput will fail. To set the active presentation, the media processor 220 calls GetPendingPresentationDescriptor( ), selects the appropriate streams and calls SetPresentationDescriptor( ). If the call to GetPendingPresentationDescriptor( ) fails, then ProcessInput( ) is called. Then GetPendingPresentationDescriptor( ) is called again until a presentation descriptor 322 can be obtained. Once a PresentationDescriptor has been set on the demultiplexer 300, it will transition to the Neutral state 404. Calling Flush( ) will discard all queued input and output data and transition the demultiplexer 300 to the pending state 402.

In the neutral state 404, all function calls (except initialize) are valid. When there is a new presentation discovered on a ProcessInput Call and the last sample from the current presentation is serviced from the output queue, the demultiplexer 300 will transition to the pending state 402.

Some streams have fixed and finite durations that can be detected based on the stream content. When this condition is detected and all output has been serviced, the demultiplexer will transition to the end_of_stream state 406. All future calls will return an appropriate error code.

When an unrecoverable error occurs in the demultiplexer 300, it will transition to the error state 408. The error state 408 can be reached from any other state. When the demultiplexer 300 is to be removed, Release( ) is called and the demultiplexer 300 transitions to the end state 410 prior to the demultiplexer 300 being removed from the system. When the last reference to the demultiplexer 300 is released, then the demultiplexer 300 is removed from memory without respect to what state the demultiplexer 300 is in. Release( ) can be called from any state, including the uninitialized state.

Now that the states and transitions of the demultiplexer 300 have been described, the commands that have been referenced above will now be described. These commands include Initialize( ), SetPresentationDescriptor( ), GetPresentationDescriptor( ), GetPendingPresentationDescriptor( ), ProcessInput( ), ProcessOutput( ), and Flush( ).

Figure 5:
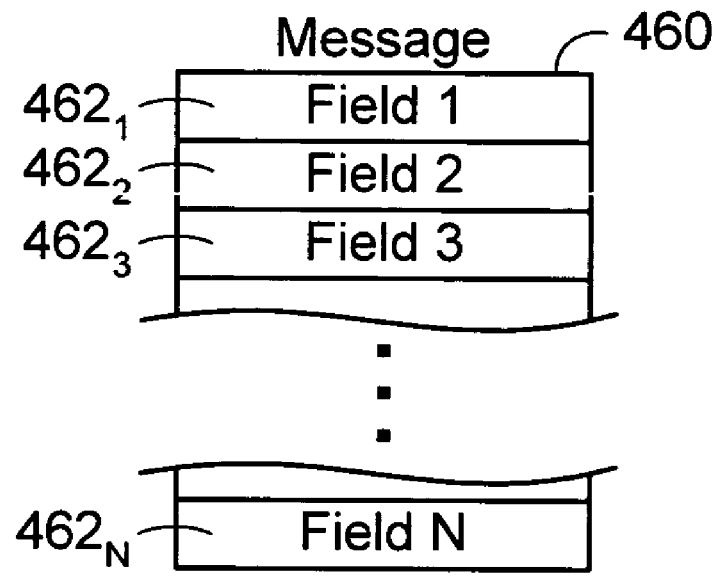
FIG. 5 is a data structure diagram illustrating the data structure model that allows for construction of calls of the present invention.

Illustrated in FIG. 5 is an exemplary data structure diagram that illustrates the basic message data structure 460 used to construct the seven messages of the demultiplexer API of the present invention. As may be seen, the message data structure 460 comprises a number of fields $462_{1-N}$. In a preferred embodiment, the first field $462_1$ is reserved for the Header. The remaining fields are parameters.

Figure 6:
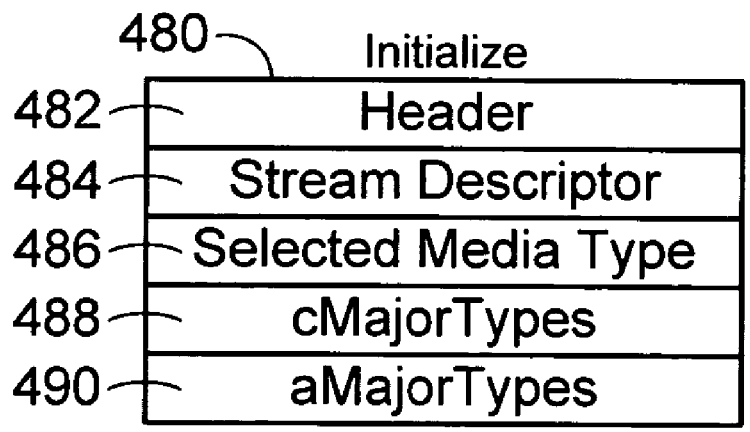
FIG. 6 is a simplified data structure diagram illustrating the construction of an exemplary message of the present invention.

In accordance with the data structure of the present invention, the Initialize command is constructed. As may be seen from the data structure diagram of FIG. 6, the Initialize command 480 is constructed from a number of fields 482-490. These fields are a header field 482, a stream descriptor object field 484, a media type field 486, a major type count field 488, and a major type array field 490. Each of the different commands are constructed in a similar fashion as illustrated in FIG. 5, and descriptions of each will be provided below.

The Initialize( ) method configures and initializes the demultiplexer object 300. The muxed stream descriptor may contain metadata appropriate to initialize the demultiplexer state (including any header data etc.). The syntax of the command is

```
HRESULT Initialize(
    IMFStreamDescriptor* pMuxedStreamDescriptor,
    IMFMediaType* pSelectedMediaType,
    DWORD cMajorTypes,
    GUID* aMajorTypes,
);
```

The pMuxedStreamDescriptor parameter is an input parameter and it is a pointer to a Stream Descriptor object that describes the muxed stream. The primary purpose for this parameter is to allow any metadata that may be on the stream descriptor to be used by the Demultiplexer 300. The pSelectedMediatype parameter is an input parameter that specifies the selected media type for the pMuxedStreamDescriptor. This is the media type corresponding to the samples that are passed to the Demultiplexer 300 in calls to ProcessInput( ). The cMajorTypes parameter is an input parameter that is the count of major types in the aMajorType array. This parameter can be zero. The aMajorTypes parameter is an input parameter and it is an array of major types of the elementary streams that the caller is interested in retrieving as output from the demultiplexer 300. This parameter can be NULL if cMajorTypes is equal to zero. The default stream of each major type found in the array will be selected in the presentation descriptor that is returned from GetPendingPresentationDescriptor( ). The method returns a S_OK value if the method succeeds. If the method fails, it returns an error code. If a presentation is available, then it can be retrieved via the GetPendingPresentationDescriptor method. If the presentation is not available after initialization, then after data has been fed to the demultiplexer via ProcessInput, a presentation may become available.

The SetPresentationDescriptor method sets the active presentation descriptor on the demultiplexer 300 indicating the new stream selection that the caller is interested in. The presentation descriptor must be a descriptor generated via the GetPresentationDescriptor method or GetPendingPresentationDescriptor method. The syntax of the command is

```
HRESULT SetPresentationDescriptor(
    IMFPresentationDescriptor* pPresentationDescriptor
);
```

The pPresentationDescriptor parameter is a pointer to a presentation descriptor object. If the method succeeds, it returns S_OK. It may fail with MF_E_INVALID_PRESENTATION if the presentation descriptor is invalid. It may fail with MF_E_OUTPUT_PENDING if the presentation descriptor is a pending presentation and there is still pending output from the current active presentation. SetPresentationDescriptor( ) may not be called with a pending presentation if there is pending output from the current active presentation. SetPresentationDescriptor( ) may be called with the active presentation to select or deselect streams. If a stream is deselected, then all samples from that stream that are in the output queue are lost. If a new stream is selected, then samples from that stream will become available at some future time. Because different streams have different input and output buffering requirements it will depend on the individual demultiplexer at what point the new stream's samples will be available.

The GetPresentationDescriptor method retrieves a clone of the currently active presentation descriptor on the demultiplexer 300. The syntax of the command is

```
HRESULT GetPresentationDescriptor(
    IMFPresentationDescriptor* ppPresentationDescriptor
);
```

The ppPresentationDescriptor is a pointer to a pointer to a presentation descriptor object. If the method succeeds, it returns S_OK. If it fails, it returns an error code. If there is pending output then GetPresentationDescriptor returns the presentation descriptor that corresponds to that output.

The GetPendingPresentationDescriptor method retrieves the next pending presentation. The syntax of the command is

```
HRESULT GetPendingPresentationDescriptor(
    IMFPresentationDescriptor* ppPendingPresentationDescriptor
);
```

The ppPendingPresentationDescriptor parameter is a pointer to a pointer to a presentation descriptor object. If the method succeeds, it returns S_OK. If there are no pending presentations, then the method returns MF_E_PRESENTATION_NOT_AVAILABLE. If ProcessInput is called several times, there may be several pending presentations queued. This method will only return the next pending presentation. Once all output for the currently active presentation has been processed, then the pending presentation is made active by calling SetPresentation.

The ProcessInput method allows the caller to provide a new input muxed stream sample to the demultiplexer. If the demultiplexer detects the presence of new streams in the presentation then the *pfNewPresentationAvailable will be set to TRUE, and the caller can retrieve the pending presentation descriptor via ::GetPendingPresentationDescriptor. The syntax of the command is

```
HRESULT ProcessInput(
    IMFSample* pSample
    BOOL* pfNewPresentationAvailable
);
```

The pSample parameter is a pointer to a sample object. If the method succeeds, it returns S_OK. The pfiVewPresentationAvailable parameter returns TRUE when a call to ProcessInput results in a new presentation descriptor being added to the pending presentation queue. The Demultiplexing operation may be done by the demultiplexer either on the call to ProcessInput or ProcessOutput. In either case the data will be queued on the call to ProcessInput until the user calls ProcessOutput or the data is discarded with a call to Flush( ). Only one presentation may be active at one time. When a new presentation is available the caller must clear all pending output by calling ProcessOutput, retrieve the new presentation by calling GetPendingPresentationDescriptor and then set the active presentation by calling SetPresentation.

The ProcessInput method allows the caller to retrieve an elementary stream or streams from the active presentation. The syntax of the command is

```
HRESULT ProcessOutput(
    DWORD dwStreamIdentifier,
    IMFSample* ppSample
);
```

The dwStreamIdentifier parameter is a 32-bit value containing the stream identifier from the active presentation for the sample requested. The ppSample parameter is a pointer to a pointer to a sample object. If the method succeeds, it returns S_OK. If it fails, it returns an error code. If the end of the stream has been reached, then the MF_E_ENDOFSTREAM error code will be returned. If E_NO_MORE_DATA is returned, there is no data available to process. Calling ProcessInput( ) with another multiplexed data sample may alleviate the error. When processing of available data is blocked because the active presentation is no longer valid, the method will return MF_E_NEW_PRESENTATION. When the presentation changes, there is a new set of streams available. The user must indicate to the demultiplexer 300 what streams are to be extracted. Calling GetPendingPresentationDescriptor, selecting the desired streams, and calling SetPresentationDescriptor( ) will enable the processing of more samples from the input queue. The Demultiplexer object 300 will allocate space for the samples if required. The Demultiplexing operation may be done by the demultiplexer either on the call to ProcessInput or ProcessOutput. In either case, the data will be queued on the call to ProcessInput until the user calls ProcessOutput or the data is discarded with a call to Flush( ).

The Flush method allows the caller to flush all currently queued input and output samples in the demultiplexer 300. Flush also clears the ActivePresentationDescriptor. This can be done when the upstream data is seeked to a new location or the caller simply wants to discard all buffered data. The syntax of the command is
    HRESULT Flush( );

There are no parameters to the Flush command. If the method succeeds, it returns S_OK. If it fails, it returns an error code. Calling Flush clears all queued data from the demultiplexer 300 as well as clearing the active presentation descriptor. Depending on the specific demultiplexer a pending presentation may be immediately available by calling GetPendingPresentation or the caller may need to repeatedly call ProcessInput until a pending presentation becomes available.

Figure 7:
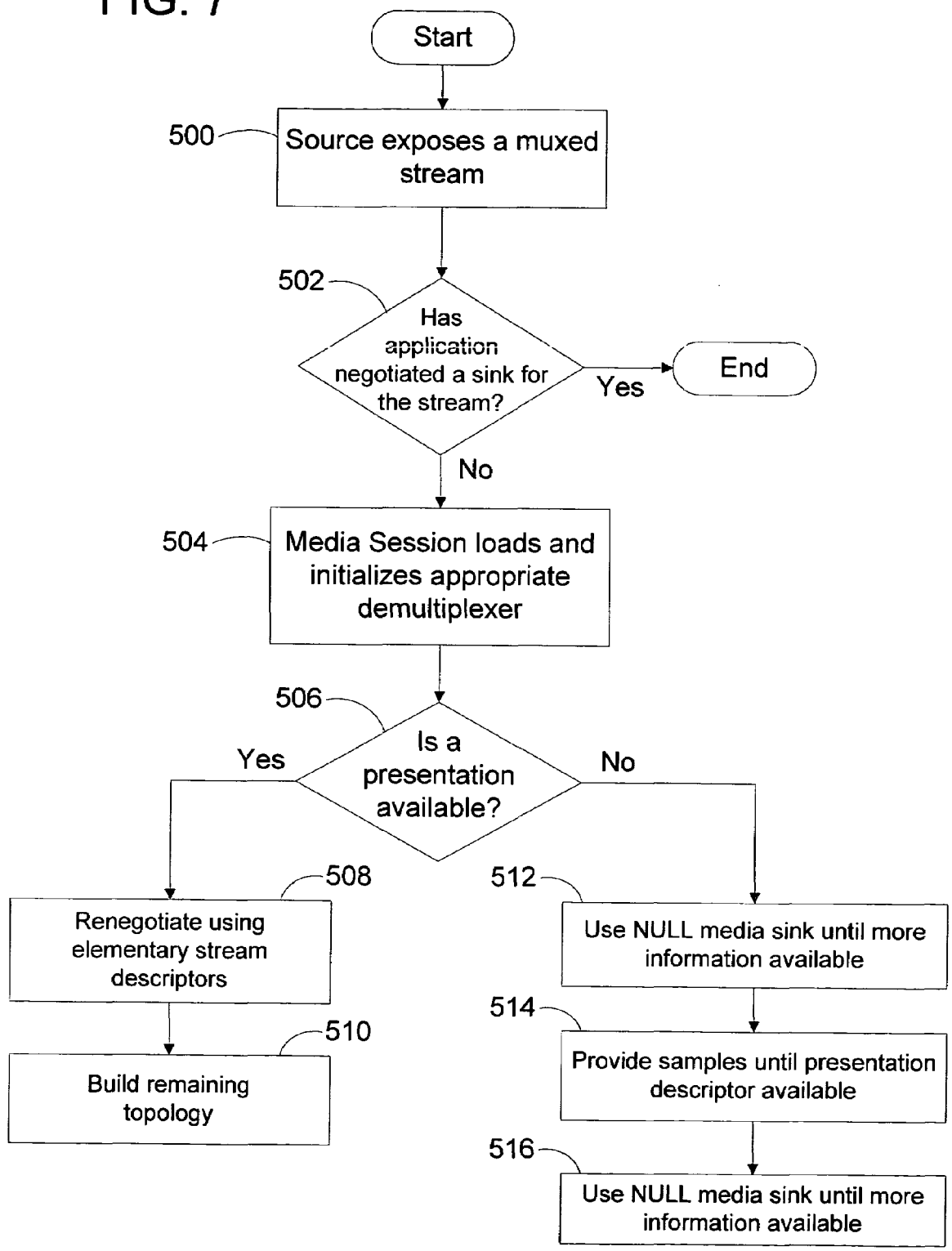
FIG. 7 is a flow chart illustrating the steps taken to load and operate the demultiplexer in accordance with the teachings of the present invention when an application does not negotiate a multi-media sink.

Now that the demultiplexer 300 commands have been described, a typical operation shall be described where the source (e.g., application 202) does not negotiate a sink that accepts the muxed stream. Turning now to FIG. 7, the source exposes the muxed stream for selection by the application (e.g. a video capture source exposes DV or a TV source exposes an MPEG2 program stream) (step 500). The control layer 201 determines if the application has negotiated a sink for the muxed stream (step 502). If the application 202 does not negotiate a sink for the muxed stream, the media session 240 loads the appropriate demultiplexer and initializes it with a muxed stream descriptor (step 504).

If a presentation is available from the demultiplexer (step 506), the media session 240 tries to renegotiate using the elementary stream descriptors (step 508). The rest of the topology is built (step 510). The exposed elementary streams are processed by media processor 220 using DMOs (e.g., decoders).

If a presentation is not available, then the media session uses a NULL media sink to terminate the topology for the muxed stream until more information is available (step 512). Whenever the session is started and samples are flowing, the demultiplexer 300 is given samples until a presentation descriptor becomes available (step 514). This is done by calling the IMFMediaStream::ProcessSample is called on the media processor node that represents the muxed stream. The media processor 220 calls IMFMediaStream::ProcessSample on the underlying muxed stream e.g. AVI source exposing DV stream. When the muxed stream sample is retrieved, the Media Processor calls IMFDemultiplexer::ProcessInput on the demultiplexer 300. The ProcessSample and ProcessInput calls continue until the new presentation flag is TRUE on Return from IMFDemultiplexer::ProcessInput. The media processor 220 then signals the media session 240 via an event that the current topology needs to be updated due to the demultiplexer change. The media session 240 calls IMFDemultiplexer::GetCurrentPresentation to get access to the newly available elementary stream descriptors. When the presentation descriptor becomes available, the media session can renegotiate using the elementary stream descriptors (step 516).

A demultiplexer API for multimedia data streams has been described. The demultiplexer API includes a set of interfaces, data structures and events for representing a demultiplexer of multimedia data. The API allows the consumer to use muxed stream data such as DV in a uniform manner to generate elementary stream darta such as audio and video (compressed or uncompressed). The API allows demultiplexers to be used as an independent component. This API reduces the need for the large number of API's for filters and a given filter no longer needs to be capable of interfacing to the API for every filter to which it might attach in systems where legacy filters are not supported. Also, the demultiplexer may be shut down gracefully as the media processor is controlling the demultiplexer and not filters in the filter graph.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A computer-readable storage medium having computer-executable instructions, that when executed on a computing system, perform a method comprising:
   implementing an interface for communication with a demultiplexer object, the interface taking multiplexed multimedia data as input and outputting demultiplexed elementary media streams, the interface comprising:
     an Initialize method configuring the demultiplexer object;
     a GetPendingPresentationDescriptor method retrieving a next pending presentation;
     a SetPresentationDescriptor method dynamically setting an active presentation descriptor of the demultiplexer object to the next pending presentation when an active presentation exists only if all output associated with the active presentation has been serviced, wherein the active presentation descriptor describes media types of an elementary stream, and facilitates selection of streams to be extracted by the demultiplexer object;

wherein if the SetPresentationDescriptor method is called attempting to set the active presentation descriptor to the next pending presentation when the active presentation exists and not all output associated with the active presentation has been serviced, the SetPresentationDescriptor method indicates that the active presentation descriptor cannot be set to the next pending presentation because not all output associated with the active presentation has been serviced, wherein the SetPresentationDescriptor method includes a pointer to a presentation descriptor object;

a ProcessInput method providing a new input muxed stream to the demultiplexer object;

a ProcessOutput method retrieving at least one elementary stream from the active presentation determined based on the dynamically set active presentation descriptor; and a Flush method flushing currently queued input and output samples.

2. The computer-readable storage medium of claim 1 wherein the interface comprises a GetPresentationDescriptor method retrieving a clone of the active presentation descriptor on the demultiplexer object.

3. The computer-readable storage medium of claim 2 wherein the GetPresentationDescriptor method includes a presentation descriptor.

4. The computer-readable storage medium of claim 1 wherein the GetPendingPresentationDescriptor method includes a pending presentation descriptor.

5. The computer-readable storage medium of claim 1 wherein the Initialize method includes parameters, the parameters comprising:
a muxed stream descriptor;
a selected media type for the muxed stream descriptor;
an array of major types of elementary streams;
and a count of major types in the array of major types.

6. The computer-readable storage medium of claim 1 wherein the ProcessInput method includes a pointer to a sample object.

7. The computer-readable storage medium of claim 6 wherein the ProcessInput method includes a return value having a new presentation flag.

8. The computer-readable storage medium of claim 7, having computer executable instructions for performing the method comprising:
if the new presentation flag has a TRUE value:
calling the GetPendingPresentationDescriptor method to retrieve the next pending presentation;
selecting desired streams; and
calling the SetPresentationDescriptor method to enable processing of samples from the demultiplexer object's input queue.

9. The computer-readable storage medium of claim 1 wherein the ProcessOutput method includes a stream identifier and a pointer to a pointer to a sample object.

10. The computer-readable storage medium of claim 9 wherein the ProcessOutput method includes an output return value.

11. The computer-readable storage medium of claim 10 wherein the output return value includes one of an end of stream error code and a no more data error code.

12. The computer-readable storage medium of claim 1, having computer executable instructions for performing the method comprising:
storing an Initialize data structure for use in a demultiplexer, comprising:
a first field containing a header;
a second field containing a muxed stream descriptor;
a third field containing a selected media type of the muxed stream descriptor;
a fourth field containing an array of major types of elementary streams; and
a fifth field containing a count of major types in the array of major types.

13. The computer-readable storage medium of claim 1, having computer executable instructions for performing the method comprising:
storing a SetPresentationDescriptor data structure for use in a demultiplexer, comprising:
a first field containing a header; and
a second field containing a presentation descriptor.

14. The computer-readable storage medium of claim 1, having computer executable instructions for performing the method comprising:
storing a GetPresentationDescriptor data structure for use in a demultiplexer, comprising:
a first field containing a header; and
a second field containing a presentation descriptor.

15. The computer-readable storage medium of claim 1, having computer executable instructions for performing the method comprising:
storing a GetPendingPresentationDescriptor data structure for use in a demultiplexer, comprising:
a first field containing a header; and
a second field containing a pending presentation descriptor.

16. The computer-readable storage medium of claim 1, having computer executable instructions for performing the method comprising:
storing a ProcessInput data structure for use in a demultiplexer, comprising:
a first field containing a header; and
a second field containing a pointer to a sample object.

17. The computer-readable storage medium of claim 1, having computer executable instructions for performing the method comprising:
storing a ProcessOutput data structure for use in a demultiplexer, comprising:
a first field containing a header;
a second field containing a stream identifier; and
a third field containing a pointer to a pointer to a sample object.

18. A computer implemented method comprising:
implementing, using a processor, an interface for communication with a demultiplexer object, the interface taking multiplexed multimedia data as input and outputting demultiplexed elementary media streams, the interface comprising:
an Initialize method configuring the demultiplexer object;
a GetPendingPresentationDescriptor method retrieving a next pending presentation:
a SetPresentationDescriptor method dynamically setting an active presentation descriptor of the demultiplexer object to the next pending presentation when an active presentation exists only if all output associated with the active presentation has been serviced, wherein the active presentation descriptor describes media types of an elementary stream, and facilitates selection of streams to be extracted by the demultiplexer object;

wherein if the SetPresentationDescriptor method is called attempting to set the active presentation descriptor to the next pending presentation when the active presentation exists and not all output associated with the active presentation has been serviced, the SetPresentationDescriptor method indicates that the active presentation descriptor cannot be set to the next pending presentation because not all output associated with the active presentation has been serviced, and wherein the SetPresentationDescriptor method includes a pointer to a presentation descriptor object;

a ProcessInput method providing a new input muxed stream to the demultiplexer object, wherein the ProcessInput method includes a pointer to a sample object;

a ProcessOutput method retrieving at least one elementary stream from an active presentation determined based on the dynamically set active presentation descriptor, wherein the ProcessOutput method includes a stream identifier and a pointer to a pointer to a sample object; and a Flush method flushing currently queued input and output samples.

19. A computer-readable storage medium having computer-executable instructions, that when executed on a computing system, perform a method comprising:

implementing an interface for communication with a demultiplexer object, the interface taking multiplexed multimedia data as input and outputting demultiplexed elementary media streams, wherein the interface takes multiplexed data as an in-memory buffer of data, the interface comprising:

an Initialize method configuring the demultiplexer object;

a GetPendingPresentationDescriptor method retrieving the next pending presentation;

a SetPresentationDescriptor method dynamically setting an active presentation descriptor of the demultiplexer object to a next pending presentation when an active presentation exists only if all output associated with the active presentation has been serviced, wherein if the SetPresentationDescriptor method is called attempting to set the active presentation descriptor to the next pending presentation when the active presentation exists and not all output associated with the active presentation has been serviced, the SetPresentationDescriptor method indicates that the active presentation descriptor cannot be set to the next pending presentation because not all output associated with the active presentation has been serviced, wherein the SetPresentationDescriptor method includes a pointer to a presentation descriptor object;

a ProcessInput method providing a new input muxed stream to the demultiplexer object, wherein the ProcessInput method includes a return value having a new presentation flag;

if the new presentation flag has a TRUE value:
  calling the GetPendingPresentationDescriptor method to retrieve the next pending presentation;
  selecting desired streams; and
  calling the SetPresentationDescriptor method to enable processing of samples from the demultiplexer object's input queue;

a ProcessOutput method retrieving at least one elementary stream from the active presentation determined based on the dynamically set active presentation descriptor;

a Flush method flushing currently queued input and output samples; and a GetPresentationDescriptor method to retrieve a clone of the active presentation descriptor on the demultiplexer object.

20. The computer-readable storage medium of claim 19 wherein the multiplexed data has a format comprising at least one of Digital Video, MPEG2, and ASF.

* * * * *